United States Patent
Hsu et al.

(10) Patent No.: US 12,221,516 B2
(45) Date of Patent: Feb. 11, 2025

(54) METHOD FOR DEGRADING POLYETHYLENE TEREPHTHALATE

(71) Applicant: Industrial Technology Research Institute, Hsinchu (TW)

(72) Inventors: Chien-Wei Hsu, Hsinchu (TW); Ssu-Ting Lin, Hsinchu (TW); Ying-Chieh Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 594 days.

(21) Appl. No.: 17/563,510

(22) Filed: Dec. 28, 2021

(65) Prior Publication Data

US 2023/0055556 A1 Feb. 23, 2023

(30) Foreign Application Priority Data

Aug. 5, 2021 (TW) .................................. 110128956

(51) Int. Cl.
| | |
|---|---|
| C08J 11/16 | (2006.01) |
| B01J 6/00 | (2006.01) |
| B01J 21/08 | (2006.01) |
| B01J 21/18 | (2006.01) |
| B01J 23/06 | (2006.01) |
| C08G 63/00 | (2006.01) |

(52) U.S. Cl.
CPC .............. *C08J 11/16* (2013.01); *B01J 6/001* (2013.01); *B01J 21/08* (2013.01); *B01J 21/18* (2013.01); *B01J 23/06* (2013.01)

(58) Field of Classification Search
USPC ........................................... 521/48; 528/272
See application file for complete search history.

(56) References Cited

U.S. PATENT DOCUMENTS

| | | |
|---|---|---|
| 6,630,601 B1 | 10/2003 | Inada et al. |
| 9,642,394 B2 | 5/2017 | Branton et al. |
| 2016/0333187 A1 | 11/2016 | Bauer et al. |

FOREIGN PATENT DOCUMENTS

| | | | |
|---|---|---|---|
| CN | 1789330 A | * | 6/2006 |
| CN | 100336587 C | | 9/2007 |
| CN | 101735061 A | | 6/2010 |
| CN | 101688015 B | | 9/2012 |
| CN | 106179293 A | | 12/2016 |
| CN | 107266664 A | | 10/2017 |
| CN | 109499563 A | | 3/2019 |
| CN | 109722737 A | | 5/2019 |
| CN | 110433790 A | | 11/2019 |
| TW | 691049 B | | 6/2004 |
| TW | 201323330 A | | 6/2013 |
| TW | 201710341 A | | 3/2017 |
| WO | 2017/111602 A1 | | 6/2017 |

OTHER PUBLICATIONS

CN-1789330-A Machine Translation (Year: 2006).*
Taiwanese Office Action of Taiwanese application No. 110128956 received Jan. 10, 2022.

* cited by examiner

*Primary Examiner* — Terressa Boykin
(74) *Attorney, Agent, or Firm* — Fox Rothschild LLP

(57) ABSTRACT

A method for degrading polyethylene terephthalate is provided. The method includes: providing polyethylene terephthalate material, providing a catalyst composite including a porous carrier having a pore size of 45 Å to 250 Å and a metal compound including at least one selected from a group consisting of zinc oxide, zinc hydroxide, zinc carbonate, magnesium oxide, calcium oxide, zirconium oxide, and titanium dioxide, in which the metal oxide is loaded on the porous carrier; and performing a degradation reaction, in which the polyethylene terephthalate material is reacted with the catalyst composite in the presence of an alcohol solvent.

12 Claims, 1 Drawing Sheet

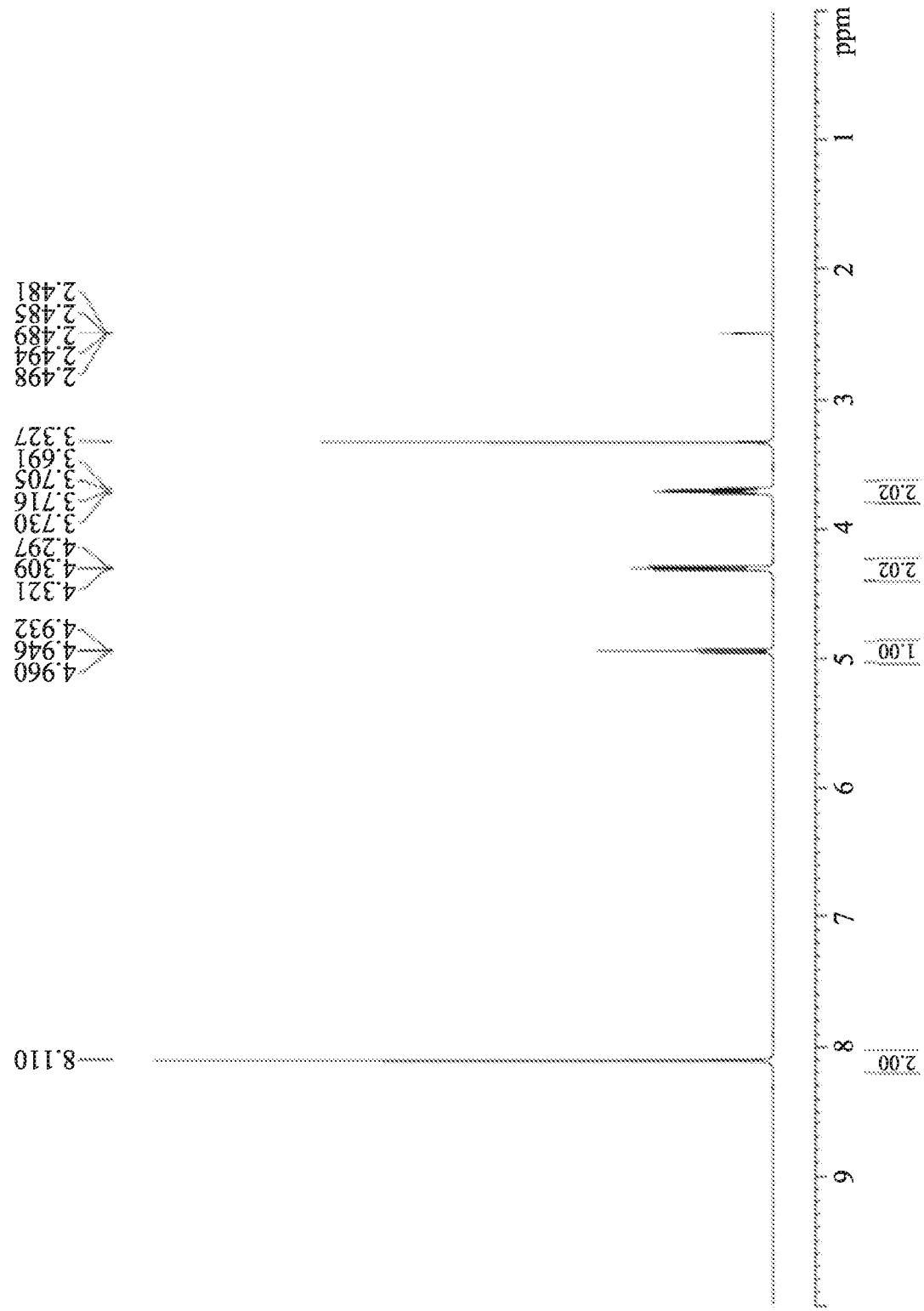

METHOD FOR DEGRADING POLYETHYLENE TEREPHTHALATE

TECHNICAL FIELD

The present disclosure relates to method for degrading polyethylene terephthalate, and more particularly, to method for degrading polyethylene terephthalate by using a catalyst composite.

DESCRIPTION OF RELATED ART

Polyethylene terephthalate (PET) is non-toxic thermoplastic polyester with good chemical tolerance and has excellent water and gas harrier properties. PET is facile to process and is frequently used in food packagiiq, freestanding thin film, fiber and textile products. The global production of PET is about 80 million tons annually, and the waste generated thereof is significant. Therefore, governments and international brands have been actively promoting the concepts and policies of plastic recycling in recent years.

For example, the Coca-Cola company aims to use 50% of recycled materials by 2030; clothing brands, e.g., the Nike incorporation and Hennes & Mauritz AB (H&M), have also announced using 100% of sustainable fiber sources by:2030; the European Union (EU) has also legislated to promote the use of recycled materials up to 30% in all PET bottles by 2030. However, most of the current plastic recycling technologies are based on physical recycling that is unable to remove additives, such as colorants and antioxidants. In addition, after repeatedly processing and reproduction by physical recycling, PET materials have serious yellowing and degradation issues and are usually used in downgrade products, such as staple fiber materials, fillers, packing tapes, etc.

Besides physical recycling, chemical recycling of PET can turn post-consumer product into either its monomer or its oligomer raw materials for further polymerization to obtain product with properties similar to that of a new one. The chemical recycling not only can treat recycled plastic with high impurity, but also broaden the application field of reproducing plastic materials. Generally, in chemical recycling of PET, homogeneous catalysts are commonly used, for example, metal acetates, sodium hydroxide, sodium methoxide, sodium carbonate, etc. However, the homogeneous catalysts are difficult to recover after degradation reaction and retain easily in the products, affecting the repolymetization reactivity. Also, excessive contents of metals can limit the application in food contact materials. Moreover, the purification of the products and the removal of the impurity play important roles in the post-consumer PET with high amount and a variety of impurities. If the separation and the purification processes can be simplified, the degradation reaction process can be economically optimized. Therefore, there is a need for developing a novel catalyst system with a high PET degradation efficiency and can be easily separated and recovered after the degradation reaction with no residue in the products, and the recovered catalyst can be reused.

SUMMARY

The present disclosure provides a method for degrading polyethylene terephthalate, comprising: providing polyethylene terephthalate material; providing a catalyst composite comprising a porous carrier and a metal compound; and performing a degradation reaction on the polyethylene terephthalate material and the catalyst composite in the presence of an alcohol solvent, wherein the porous carrier has a pore size of 45 Å to 250 Å; the metal compound comprises at least one selected from a group consisting of zinc oxide, zinc hydroxide, zinc carbonate, magnesium oxide, calcium oxide, zirconium oxide, and titanium dioxide, and the metal compound is loaded on the porous carrier.

BRIEF DESCRIPTION OF THE DRAWINGS

FIG. 1 shows a $^1$H NMR spectrum of the BHET product degraded from polyethylene terephthalate in Example 1 of the present disclosure.

DESCRIPTION OF THE EMBODIMENTS

The following describes the implementation of the present disclosure with examples. A person of ordinary skills in the art can easily understand the other advantages and effects of the present disclosure from the content disclosed in this specification.

As used herein, the numerical ranges described herein are inclusive and can be combined, and any value falling into the numerical ranges described herein can be used as the upper or lower limit to derive a subrange; for example, the numerical range of "2.00 to 3.50" should be understood to include any subrange from a lower limit of 2.00 and an upper limit of 3.50, e.g, subranges of 2.00 to 3.00, 2.50 to 3.50, and 2,50 to 3.00 and so on. In addition, if a value falls within a range described herein (for example, between the upper limit and the lower limit), it should be considered to be included in the range of the present disclosure.

This disclosure provides a method for degrading polyethylene terephthalate, including: providing polyethylene terephthalate; providing a catalyst composite including a porous carrier with a pore size of 45 Å to 250 Å; and a metal compound comprising at least one selected from a group consisting of zinc oxide, zinc hydroxide, zinc carbonate, magnesium oxide, calcium oxide, zirconium oxide, and titanium dioxide, and the metal compound is loaded on the porous carrier; and performing a degradation reaction on the polyethylene terephthalate material and the catalyst composite in the presence of an alcohol solvent.

In an embodiment, the porous carrier includes an activated carbon, silicon dioxide, or a combination thereof, for ple, the material is composed of activated carbons or composed of silicon dioxide.

In an embodiment, a content of the metal compound is 8 to 35 wt % based on the total weight of the catalyst composite, for example 8, 9, 10, 11, 12, 13, 14, 15, 16, 17, 18, 19, 20, 21, 22, 23, 24, 25, 26, 27, 28, 29, 30, 31, 32, 33, 34 or 35 wt %.

in an embodiment, the porous carrier has a surface area of 250 m$^2$/g to 1500 m$^2$/g, for example, 250, 300, 350, 400, 450, 500, 550, 600, 650, 700, 750, 800, 850, 900, 950, 1000, 1.050, 1100, 11.50, 1200, 1250, 1.300, 1350, 1400, 1.450 or 1500 m$^2$/g.

In an embodiment, the porous carrier has a pore size of 45 Å to 250 Å, for example, 45, 50, 55, 60, 65, 70, 75, 80, 85, 90, 95, 100, 110, 120, 130, 140, 150, 160, 170, 180, 190, 200, 210, 220, 230, 240, or 250 Å. The surface area and the pore size of the porous carrier of the present disclosure are measured by high-performance automatic gas adsorption system, ASAP2020.

In an embodiment, the polyethylene terephthalate material is a mixture including polyethylene terephthalate, the mixture comprises polyethylene terephthalate and a first polymer, and with a content of polyethylene terephthalate ranges from 90 wt % to close to but less than 100 wt %, for example, 90, 91, 92, 93, 94, 95, 96, 97, 98, 99 or close to but less than 100 wa.

In an embodiment, the first polymer includes poly(lactic acid), polystyrene, polyolefin, or a combination thereof, and a content of the first polymer is greater han 0 to 10 wt %.

In an embodiment, the alcohol solvent. includes a $C_{1-10}$ mono-ol, a $C_{1-10}$ diol, or a
combination thereof.

In an embodiment, a weight ratio of the catalyst composite to the polyethylene terephthalate material is 1:40 to 1:10, for example, 1:40, 1:30, 1:20 or 1: 10.

In an embodiment, a source of the polyethylene terephthalate material is at least one selected from a group consisting of polyethylene terephthalate bottles, polyethylene terephthalate flat sheets, packaging materials of polyethylene terephthalate, and woven fabrics of polyethylene terephthalate, which are colorless and transparent or multicolored, In an embodiment, a reaction temperature of the degradation reaction is 160 to 230° C., for example, 160, 170, 180, 190, 200, 210, 220 or 230° C., and a reaction time is 2 to 6 hours, such as 2, 3, 4, 5 or 6 hours.

In an embodiment, the method of the present disclosure further comprises a step of recycling the catalyst composite after the degradation reaction is performed. In particular, the recycling step includes filtering the mixture obtained from the degradation reaction, after a filtered cake obtained thereof is dried, it can be directly used in the next degradation reaction.

This disclosure will describe further in detail with reference to the following examples, but these examples are by no means intended to limit the scope of this disclosure.

Preparation of Catalyst A 100 ml of an aqueous solution containing zinc nitrate (0.1 M) and hexamethylenetetramine (0.1 NI) was prepared. The aqueous solution was stirred, and an aqueous solution of 0.1 M NaOH was added dropwise thereto at root ter perature until a pH of 8 was reached. Then, the solutionwas heated and stirred at 80° C. for 6 hours. After the reaction was completed, 50 g of activated carbons (commercially available from SHOWA Co,, Ltd.) were added to the reaction flask, and the mixture in the reactionflask was stirred at room temperature for 3 hours and was filtered afterward. After the obtained filter cake was washed by deionized water for several times, the filter cake was dried in an oven at 80° C. The elemental quantitative analysis was performed by X-ray fluorescence (XRF), and the detected content of Zn was 8.3%.

Preparation of Catalyst B 100 ml of an aqueous solution containing zinc nitrate (0,2 M) and hexamethylenetetramine (0.1 M) was prepared. The aqueous solution was stirred, and an aqueous solution of 0.1 M NaOH was added dropwise thereto at room temperature until a pH of 8 was reached. Then, the solution was heated and stirred at 80° C. for 6 hours. After the reaction was completed, 50 g of activated carbons were added to the reaction flask, and the mixture in the reaction flask was stirred at room temperature for 3 hours and was filtered afterward. After the obtained filter cake was washed by deionized water for several times, the filter cake was dried in an oven at 80° C. The XRF quantitative. analysis showed that the detected content of Zn was 16.8%.

Preparation of Catalyst C 30 g of activated carbons were weighed and dried at 1.50° C. for later use, and 14 g of zinc nitrate hexahydrate was weighed and dissolved in 8 mt, of water to limn an aqueous solution of zinc nitrate. This aqueous solution was added dropwise to the activated carbons and was stirred uniformly at the same time. The activated carbons containing zinc nitrate were placed in a high-temperature furnace, nitrogen was introduced, and the temperature was raised to 450° C. for drying and calcining for 4 hours. After cooling to room temperature, the activated carbons containing zinc oxide were obtained and were ready to be used. MU' quantitative analysis showed that the detected content of Zn was 32.0%.

Preparation of Catalyst D

Carbon blacks were prepared from 30 g of waste tires (provided by Enrestec INC, PB-610). The XRF element quantitative analysis of the inactivated waste tires showed that the detected content of Si, S, Ca and Zn were 6.07%, 4.89%, 1.74%, and 16.5%, respectively. The carbon blacks were placed in a rotating high-temperature furnace after drying. The high-temperature furnace was closed, and the air was removed through introducing nitrogen. The temperature was raised to 500° C. at a rate of 15° C./min, the timer was started, and the carbonizing time was about 2 to 3 hours. The temperature can be directly raised to the activation stage at the end of the process. The nitrogen was turned off after the reaction temperature was raised to 950° C., water vapor (0.39 gimin) and air flow (0.3 L/min) were introduced, and the activation reaction was started, After proceeding the reaction for 30 minutes, the water vapor and air were turned off, nitrogen was introduced to remove the air, and temperature was cooled to room temperature. The XRF quantitative analysis showed that the detected content of Zn was 17.0%.

Preparation of Catalyst E 30 g of activated carbons were weighed and dried at 1.50° C. for later use, and 3 g of magnesium nitrate was weighed and dissolved in 8 mL of water to form an aqueous solution of magnesium nitrate. This aqueous solution was added dropwise to the activated carbons, and was stirred uniformly at the same time. The activated carbons containing magnesium nitrate were placed in a high temperature furnace, nitrogen was introduced, and the temperature was raised to 450° C. for drying and calcining for 4 hours. After cooling to room temperature, the activated carbons containing magnesium oxide were obtained and were ready to be used. The XRF quantitative analysis showed that the detected content of Mg was 8.3%.

Preparation of Catalyst F 30 g of silicon dioxide powder (a pore size of 28.9 Å) was weighed and dried at 1.50° C. for later use. Then, 14 g of zinc nitrate hexahydrate was then weighed and dissolved in 8 mL of water to form an aqueous solution of zinc nitrate. This aqueous solution was added dropwise to silicon dioxide powder and was stirred uniformly at the same time. Silicon dioxide powder containing zinc nitrate was placed in a high-temperature furnace, and the temperature was raised to 450° C. for drying and calcining for 4 hours. After cooling to room temperature, silicon dioxide powder containing zinc oxide was obtained and was ready to be used. The XRF quantitative analysis showed that the detected content of Zn was 13,9%.

Preparation of Catalyst G 30 g of silicon dioxide powder (a pore size of 98.7 Å) was weighed and dried at 150° C. for later use. 14 g of zinc nitrate hexahydrate was weighed and dissolved in 8 mL of water to form an aqueous solution of zinc nitrate. This aqueous solution was added dropwise to silicon dioxide powder and was stirred uniformly at the same time. Silicon dioxide powder containing zinc nitrate was placed in a high-temperature furnace, and the temperature was raised to 450° C. for drying and calcining for 4 hours. After cooling to room temperature, silicon dioxide powder containing zinc oxide was obtained and was ready to be used. XRF quantitative analysis showed that the detected content of Zn was 14.1%.

Preparation of Catalyst H 30 g of activated carbons were weighed and dried at 150° C. for later use, and 25 g of zinc nitrate hexahydrate was weighed and dissolved in 8 mL of water to form an aqueous solution of zinc nitrate. This aqueous solution was added dropwise to the activated carbons and was stirred uniformly at the same time. The activated carbons containing zinc nitrate were placed in a high-temperature furnace, cogen was introduced, and the temperature was raised to 450° C. for drying and calcining for 4 hours. Afterwards, the activated carbons containing zinc oxide were cooled to room temperature and were ready to be used. XRF quantitative analysis showed that the detected content of Zn was 43.9%, Preparation of Catalyst I 30 g of activated carbons were dried at 150° C. for later use. Then, 1 g of zinc nitrate hex ahydrate was weighed and dissolved in 8 mL of water to form an aqueous solution of zinc nitrate. This aqueous solution was added dropwise to the activated carbons and was stirred uniformly at the same time. The activated carbons containing zinc nitrate were placed in a high-temperature furnace, nitrogen was introduced, and the temperature was increased to 450° C. for 1.5 drying and calcining for 4 hours. Afterwards, the activated carbons containing zinc oxide were cooled to room temperature and were ready to be used. XRF quantitative analysis showed that the detected content of Zn was 1.8%.

EXAMPLE 1

20 g of flakes of mixed PEI' bottles t'aING IEE ENVIRONMENTAL TECHNOLOGY CO, LTD, with 90% PET content, and a bottle flake size of about 1 cm×1 cm), 2 g of catalyst A, and 120 g of ethylene glycol were added in 250 mL of a single neck bottle, a condenser tube was assembled, and the mixture was stirred and heated at 200° C. for 6 hours, After the reaction was completed, the temperature was cooled to 100° C., the mixture was filtered off while still being hot, and 240 g of &ionized. water was added to the filtrate. Afterwards, the mixed solution was heated to 90° C. till completely dissolved, and the mixed solution was then filtered off while cooling down to 50° C. The filter cake was BHET (his(2-hydroxyethyl) terephthalate) oligomers, and the filtrate was refrigerated and recrystallized at 4° C., After the recrystallized product was filtered, white BHET product was obtained. The weight of the obtained product was 20.05 g, and the yield was 84.2%, CIELAB color space analysis showed L=93.0, a=1.08, and b=1.00. Next, the BHET product was analyzed by Nuclear Magnetic Resonance spectroscopy, and the resulting spectral information is shown in FIG. 1: $^1$H-NMR (400 MHz, $d_6$-DMSO) 8.11(s, 4H), 4.95(t, 2H), 4.30(t, 4H), 3.71(q, 4H).

EXAMPLE 2

The steps were the same as in Example 1, but using 2 g of catalyst B. The weight of the obtained product was 20,71 g, and the yield was 86.9%. CIELAB color space analysis showed L=94.2, a=0.14, b=1.49.

EXAMPLE 3

The steps were the same as in Example 1, but using 2 g of catalyst C. The weight of the obtained product was 19.02 g and the yield was 80.7%. CIELAB color space analysis showed L=91.1, a=0.59, b=4.31.

EXAMPLE 4

The steps were the same as in Example 1, but using 6 g of catalyst D. The weight of the obtained product was 19.94 g, and the yield was 83.8%. CIELAB color space analysis showed L=90.7, a=−0.05, b=1.87.

EXAMPLE 5

The steps were the same as in Example 1, but using 2 g of catalyst E. The weight of the obtained product was 20.0 g, and the yield was 81.6%. CIELAB color space analysis showed L=91.1, a=0.37, b=1.4.

EXAMPLE 6

The steps were the same as in Example 1, but using 2 g ref catalyst 6, The obtained product was 20.0 g, and the yield was 83.9%. CIELAB color space analysis showed L=87.6, a=2.05, b=5.81.

EXAMPLE 7

The steps were the same as in Example 1, but using 20 g of flakes of green-color PET bottles (PET>99%, about 1 cm×1 cm) and 6 g of catalyst D. The weight of the obtained product was 21.2 g, and the yield was 80.1%. CIELAB color space analysis showed L=94.4, a=−1.18, b=0.98.

EXAMPLE 8

20 g of flakes of green-color PET bottles (PET>99%, about 1 cm×1 cm), 2 g of transparent PLA plastic flakes (about 1 cm×1 cm), 3 g of catalyst D, and 120 g of ethylene glycol were added in 250 mt.. of a single-neck bottle, a condenser tube was assembled, and the mixture was stirred and heated at 200° C. for 6 hours. After the reaction was completed, the temperature was cooled to 100° C., the mixture was filtered off while still being hot, and 240 g of deionized water was added to the filtrate. Afterwards, the mixed solution was heated to 90° C. till completely dissolved, and the filtrate was then filtered off while cooling down to 50° C. The filter cake was BHET oligomers, and the filtrate was refrigerated and recrystallized at 4° C. After the recrystallized product was filtered, white BHET product was obtained. The weight of the obtained product was 21.1 g, and the yield was 79.6%

EXAMPLE 9

The steps were the same as in Example 8, hut using 20 g of green-color PET bottle flakes, 1 g of transparent PP plastic flakes and 6 g of catalyst C. The weight of the obtained product was 20.6 g, and the yield was 77.8%,

EXAMPLE 10

The steps were the same as in Example 8, hut using 20 g of green-color PET bottle flakes, 2 g of transparent PS plastic flakes and 6 g of catalyst C. The weight of the obtained product was 21.6 g, and the yield was 81.7%.

EXAMPLE 11

20 g of flakes of green-color PET bottles (about 1 cm×1 cm), 6 g of recycled catalyst D obtained from Example 7 after used, and 120 g of ethylene glycol were placed in a 250 mL single-neck bottle, a condenser tube was assembled, and the mixture was stirred and heated at 200° C. for 6 hours. After the reaction was completed, the temperature was cooled to 100° C., the mixture was filtered off while still being hot, and 240 g of deionized water was added to the filtrate. Afterwards, the mixed solution was heated to 90° C. till completely dissolved, and the filtrate was then filtered off while cooling down to 50° C. The filter cake was BHET oligomers, and the filtrate was refrigerated and recrystallized at 4° C. After the recrystallized product was filtered, white BHET product was obtained. The weight of the obtained product was 21.1 g, and the yield was 79.8%. CIELAB color space analysis showed L=96.1, a=0.32, b=2.10.

EXAMPLE 12

20 g of flakes of green-color PET bottles (about 1 cm×1 cm), 6 g of recycled catalyst D obtained from Example 11 after used, and 120 g of ethylene glycol were placed in a 250 mL single-neck bottle, a condenser tube was assembled, and the mixture was stirred and heated at 200° C. for 6 hours, After the reaction was completed, the temperature was cooled to 100° C., the mixture was filtered off while still being hot, and 240 g of deionized water was added to the filtrate, Afterwards, the mixed solution was heated to 90° C. till completely dissolved, the filtrate was then filtered off while cooling down to 50° C. The filter cake was BHET oligomers, and the filtrate was refrigerated and recrystallized at 4° C. After the recrystallized product was filtered, white BHET product was obtained. The weight of the obtained product vas 18.7 g and the yield was 70.7%, CIELAB color space analysis, L=96.3, a=0.04, b=2.12.

COMPARATIVE EXAMPLE 1

20 g of flakes of mixed PET bottles (with 90% of PET, and bottle flakes size of about 1 cm×1 cm), 0.2 g of zinc oxide as the catalyst and 120 g of ethylene glycol were placed in a 250 nit, single-neck bottle, a condenser tube was assembled, and the mixture was stirred and heated at 200° C. for 6 hours. After the reaction was completed, the temperature was cooled to 100° C., the mixture was filtered off while still being hot, and 240 g of deionized water was added to the filtrate. Afterwards, the mixed solution was heated to 90° C. till completely dissolved, the filtrate was then filtered off while cooling down to 50° C. The filter cake was MET oligomers, and the filtrate was refrigerated and recrystallized at 4° C. After the recrystallized product was filtered, brown MET product was obtained. The weight of the obtained product was 19.61 g and the yield was 82.4%. CIELAB color space analysis showed L=71.6, a=5.34, b=14.45.

COMPARATIVE EXAMPLE 2

The steps were the same as Comparative Example 1, but using 2 g of catalyst F. The weight of the obtained product was 20.94 g, and the yield was 87.9%. CIELAB color space analysis showed L=77.5, a=5.91, b=1.0.0,

COMPARATIVE EXAMPLE 3

The steps were the same as Comparative Example 1, but using 2 g of catalyst H. The weight of the obtained product was 16.94 g and the yield was 71.9%. CIELAB color space analysis showed L=96.3, a=0.07, b=1.58.

COMPARATIVE EXAMPLE 4

The steps were the same as Comparative Example 1, but using 2 g of Catalyst I. The weight of the obtained product was 2.38 g, and the yield was 10.1%. CIELAB color space analysis: L=95.3, a=0.72, b=1.26.

The compositions, properties and yields of Catalyst A to Catalyst I are listed in Table 1, and the surface area and the pore size thereof were measured by high-performance automatic gas adsorption system, ASAP2020.

TABLE 1

| | ZnO (%) | MgO (%) | type of carrier | surface area of carrier ($m^2/g$) | pore size of carrier (Å) | Yield (%) |
|---|---|---|---|---|---|---|
| Catalyst A | 8.3 | — | activated carbon | 981.9 | 47.8 | 84.2 (Example 1) |
| Catalyst B | 16.8 | — | activated carbon | 957.9 | 48.3 | 86.9 (Example 2) |
| Catalyst C | 32.0 | — | activated carbon | 522.0 | 52.6 | 80.7 (Example 3) |
| Catalyst D | 17.0 | — | activated carbon | 297.0 | 173.9 | 83.8 (Example 4) |
| Catalyst E | — | 8.3 | activated carbon | 620.7 | 50.1 | 81.6 (Example 5) |
| Catalyst F | 13.9 | — | $SiO_2$ | 580.8 | 28.9 | 87.9 (Comparative Example 2) |
| Catalyst G | 14.1 | — | $SiO_2$ | 448.9 | 98.7 | 83.9 (Example 6) |
| Catalyst H | 43.9 | — | activated carbon | 507.2 | 56.4 | 71.9 (Comparative Example 3) |
| Catalyst I | 1.8 | — | activated carbon | 980.2 | 47.8 | 10.1 (Comparative Example 4) |

As shown in Table 1, the catalysts include different metal compounds, types of the carrier, surface area and pore sizes of the carriers. When degrading the flakes of mixed PET bottles with the catalyst having a metal compound content in the range of 8 to 35 wt %, the yield of MET product is over 80%. When the content of metal compounds was too high or too low (for example, Catalysts H and I), the PET degradation will be affected.

The amount of the catalysts in Examples 1 to 6 and Comparative Example 1 to 4 and the properties of the products after degradation are listed in Table 2.

TABLE 2

| — | PET | catalyst | the amount of catalyst (g) | surface area of carrier (m²/g) | pore size of carrier (Å) | b value (yellow-blue) | Zn content in product (%) |
|---|---|---|---|---|---|---|---|
| Example 1 | Mixed flakes | A | 2 | 981.9 | 47.8 | 1.00 | — |
| Example 2 | Mixed flakes | B | 2 | 957.9 | 48.3 | 1.49 | — |
| Example 3 | Mixed flakes | C | 2 | 522.0 | 52.6 | 4.31 | 5.6 |
| Example 4 | Mixed flakes | D | 6 | 297.0 | 173.9 | 1.87 | — |
| Example 5 | Mixed flakes | E | 2 | 620.7 | 50.1 | 1.40 | — |
| Example 6 | Mixed flakes | G | 2 | 448.9 | 98.7 | 5.81 | — |
| Comparative example 1 | Mixed flakes | ZnO | 0.2 | — | — | 14.45 | 48.8 |
| Comparative example 2 | Mixed flakes | F | 2 | 580.8 | 28.9 | 10.0 | — |
| Comparative example 3 | Mixed flakes | H | 9 | 507.2 | 56.4 | 1.58 | — |
| Comparative example 4 | Mixed flakes | I | 2 | 980.2 | 47.8 | 1.26 | — |

As shown in Table 2, b indicatesa yellow-blue value, and the color of the products is more yellow when the number is more positive. Activated carbon porous material was not used in Comparative Example 1, the color performance of the product is poor, and the content of Zn in the product is more than 40 ppm. The pore size of the carrier is smaller in Comparative Example 2, and the adsorption of impurities is limited, such that the chromaticity b value is higher than that of other Examples of the present disclosure. In Comparative Examples 3 and 4, although the b values of the products are less than 2, the product yield is poor since the content of zinc oxide in the catalysts is too high or too low.

The yields of degrading PET with additional non-PET plastic materials are listed in Table 3.

TABLE 3

| | other plastic impurities | added weight (g) | yield (%) |
|---|---|---|---|
| Example 7 | none | 0 | 80.1 |
| Example 8 | PLA | 2 | 79.6 |
| Example 9 | PP | 1 | 77.8 |
| Example 10 | PS | 2 | 81.7 |

As can be seen in Table 3, the catalysts of the present disclosure have a high tolerance to additional plastic impurities. The degradation reaction is not significantly affected by the existence of non-PET plastic impurities (5 to 10%), such as PLA, PP, PS, etc.

The product yield, the b value of the product and the recovery rate of catalysts with different usage counts of the present disclosure are listed in Table 4.

TABLE 4

| | usage count | BHET yield (%) | recovery of the catalyst (%) | b value of BHET |
|---|---|---|---|---|
| Example 7 | 1 | 80.1 | 99.5 | 0.98 |
| Example 11 | 2 | 79.8 | 99.2 | 2.10 |
| Example 12 | 3 | 70.7 | 99.1 | 2.12 |

As shown in Table 4, the catalysts of the present disclosure can be reused and can be collected and recycled through filtration after reaction, and the recovery rate of the catalysts is more than 99%. In addition, the h values of the products from the degradation eaction of PET using the recycled catalysts are less than 3.

The above-mentioned embodiments are used for the purpose of illustrating the principles and effects only rather than limiting the present disclosure. Anyone skilled in the art. can modify the above enthodintents without departing from the spirit and scope of the present disclosure. Therefore, the scope claimed by the present disclosure should be as described by the accompanying claims listed below.

What is claimed is:

1. A method for degrading polyethylene terephthalate, comprising:
   providing polyethylene terephthalate material;
   providing a catalyst composite, comprising:
   a porous carrier having a pore size of 45 Å to 250 Å; and
   a metal compound loaded on the porous carrier, comprising at least one selected from a group consisting of zinc oxide, zinc hydroxide, zinc carbonate, magnesium oxide, calcium oxide, zirconium oxide, and titanium dioxide; and
   performing a degradation reaction on the polyethylene terephthalate material and the catalyst composite in the presence of an alcohol solvent.

2. The method for degrading polyethylene terephthalate as claimed in claim 1 wherein the porous carrier comprises an activated carbon, silicon dioxide, or a combination thereof.

3. The method for degrading polyethylene terephthalate as claimed in claim 1, wherein a content of the metal compound is 8 wt % to 35 wt %, based on the total weight of the catalyst composite.

4. The method for degrading polyethylene terephthalate as claimed in claim 1 wherein a surface area of the porous carrier is 250 m²/g to 1500 m²/g.

5. The method for degrading polyethylene terephthalate as claimed in claim 1, wherein the polyethylene terephthalate material is a mixture comprising polyethylene terephthalate, the mixture comprises polyethylene terephthalate and a first polymer, wherein a content of the polyethylene terephthalate is 90 wt % to less than 100 wt %.

6. The method for degrading polyethylene terephthalate as claimed in claim 5, wherein the first polymer comprises poly (lactic acid), polystyrene, polyolefin, or a combination thereof.

7. The method for degrading polyethylene terephthalate as claimed in claim 1, wherein the alcohol solvent comprises a mono-ol of $C_{1-10}$, a diol of $C_{1-10}$, or a combination thereof.

8. The method for degrading polyethylene terephthalate as claimed in claim 1, wherein a weight ratio of the catalyst composite to the polyethylene terephthalate material is 1:40 to 1:10.

9. The method for degrading polyethylene terephthalate as claimed in claim 1, wherein a source of the polyethylene terephthalate material is at least one selected from a group consisting of colorless transparent or multicolored polyethylene terephthalate bottles, polyethylene terephthalate flat sheets, polyethylene terephthalate packaging materials, and fabrics containing polyethylene terephthalate.

10. The method for degrading polyethylene terephthalate as claimed in claim 1, wherein a reaction temperature of the degradation reaction is 160° C. to 230° C., and a time of the degradation reaction is 2 to 6 hours.

11. The method for degrading polyethylene terephthalate as claimed in claim 1, further comprising recovering the catalyst composite after the degradation reaction is performed.

12. A method for degrading polyethylene terephthalate, comprising:

providing polyethylene terephthalate material;

providing a catalyst composite, comprising:

a porous carrier having a pore size of 45 Å to 250 Å and comprising an activated carbon, silicon dioxide, or a combination thereof, and wherein a surface area of the porous carrier is 250 $m^2$/g to 1500 $m^2$/g; and a metal compound loaded on the porous carrier, comprising at least one selected from a group consisting of zinc oxide, zinc hydroxide, zinc carbonate, magnesium oxide, calcium oxide, zirconium oxide, and titanium dioxide; and performing a degradation reaction on the polyethylene terephthalate material and the catalyst composite in the presence of an alcohol solvent, wherein the polyethylene terephthalate material is a mixture comprising polyethylene terephthalate, the mixture comprises polyethylene terephthalate and a first polymer, wherein a content of the polyethylene terephthalate is 90 wt % to less than 100 wt %, and the first polymer comprises poly (lactic acid), polystyrene, polyolefin, or a combination thereof.

* * * * *